United States Patent
Maenpaa et al.

(10) Patent No.: US 10,592,941 B2
(45) Date of Patent: *Mar. 17, 2020

(54) SYSTEM AND METHOD FOR GENERATING AND STORING DIGITAL RECEIPTS FOR ELECTRONIC SHOPPING

(71) Applicant: MASTERCARD INTERNATIONAL INCORPORATED, Purchase, NY (US)

(72) Inventors: Pia Maenpaa, White Plains, NY (US); Joshua Kessler, Danbury, CT (US); Jaclyn Moore, Port Chester, NY (US); John Dallesandro, Millwood, NY (US); Laurie Chiola, Bedford Hills, NY (US); Erin Kieran, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/895,370

(22) Filed: Feb. 13, 2018

(65) Prior Publication Data

US 2018/0182003 A1    Jun. 28, 2018

Related U.S. Application Data

(63) Continuation of application No. 13/774,623, filed on Feb. 22, 2013, now Pat. No. 9,892,434.

(51) Int. Cl.
*G06Q 20/04* (2012.01)
*G06Q 30/04* (2012.01)

(52) U.S. Cl.
CPC ......... *G06Q 30/04* (2013.01); *G06Q 20/0453* (2013.01)

(58) Field of Classification Search
None
See application file for complete search history.

(56) References Cited

U.S. PATENT DOCUMENTS

| | | | | |
|---|---|---|---|---|
| 6,032,857 A | * | 3/2000 | Kitagawa | G06K 19/073 235/379 |
| 7,552,087 B2 | * | 6/2009 | Schultz | G06Q 20/0453 705/38 |
| 2002/0179704 A1 | | 12/2002 | Deaton | |
| 2003/0158819 A1 | | 8/2003 | Scott | |
| 2007/0045405 A1 | | 3/2007 | Rothschild | |
| 2009/0271322 A1 | | 10/2009 | Lay et al. | |
| 2010/0299217 A1 | * | 11/2010 | Hui | G06Q 10/10 705/23 |

(Continued)

*Primary Examiner* — Joseph W. King
(74) *Attorney, Agent, or Firm* — Ohlandt, Greeley, Ruggiero & Perle L.L.P.

(57) ABSTRACT

A system and a method are provided for generating a digital receipt for purchases made utilizing a digital wallet or with other payment procedures. The digital receipt is stored in the cloud in a digital receipts repository for later retrieval. The digital receipt can be standardized to facilitate data processing of the data contained in data fields of the digital receipt. The data fields are text/field searchable and actionable so that the receipts and the data therein can be viewed in any manner desired by the user of the digital wallet.

15 Claims, 6 Drawing Sheets

(56) References Cited

U.S. PATENT DOCUMENTS

| | | | |
|---|---|---|---|
| 2012/0221446 A1* | 8/2012 | Grigg | G06Q 30/04 705/30 |
| 2013/0151344 A1* | 6/2013 | Tavares | G06Q 30/00 705/14.65 |
| 2014/0344149 A1* | 11/2014 | Campos | G06Q 20/36 705/41 |

* cited by examiner

| | |
|---|---|
| Business Name | ⬜ ~300 |
| Business Address | ⬜ ~302 |
| Business Telephone Number | ⬜ ~304 |
| Business Fax Number | ⬜ ~306 |
| Business E-Mail Address | ⬜ ~308 |
| Business Category Code | ⬜ ~310 |
| How Purchase Made (POS, Telephone, On-line, Digital Wallet | ⬜ ~312 |
| | |
| Customer Name | ⬜ ~320 |
| Customer Address | ⬜ ~322 |
| Customer Telephone Number | ⬜ ~324 |
| Customer Fax Number | ⬜ ~326 |
| Customer E-Mail Address | ⬜ ~328 |
| Customer Account (last four digits to be displayed) | ⬜ ~330 |
| Currency Used | ⬜ ~332 |

| Description of Goods/Services | SKU Number | Price | 340 |
|---|---|---|---|
| ~342A | ~342B | ~342C | |
| ~344A | ~344B | ~344C | |
| ~346A | ~346B | ~346C | |

| | | | | |
|---|---|---|---|---|
| Time and Date of Transaction | 348A | 348B | | |
| Sum of Price(s) | ⬜ ~350 | | | |
| Discounts | 352A | 352B | 352C | 352D |
| Tax on Total Price(s) | 354A | 354B | 354C | 354D |
| Total Charged to Account | ⬜ ~356 | | | |
| Customer Tag | 358A | 358B | 358C | 358D |

*FIG. 3*

SYSTEM AND METHOD FOR GENERATING AND STORING DIGITAL RECEIPTS FOR ELECTRONIC SHOPPING

CROSS REFERENCE TO RELATED APPLICATIONS

This application is a continuation of U.S. patent application Ser. No. 13/774,623, filed Feb. 22, 2013, the entire content of which is incorporated by reference herein.

BACKGROUND OF THE DISCLOSURE

1. Field of the Disclosure

The present disclosure relates to electronic shopping. More particularly, it relates to a system and/or method for generating a digital receipt for purchases made using a digital wallet of other payment procedures.

2. Description of the Related Art

Online and point of sale shopping are becoming very convenient for consumers. The recent introduction of digital wallet services makes point of sale (POS) and online shopping safe and easy by storing all payment and shipping information in one convenient and secure place. With a digital wallet, the consumer simply can shop and checkout faster. At merchant locations equipped with near field communication (NFC) terminals, checkout can be done simply and easily by using an application on a suitable mobile device. During POS or online shopping, from a home computer or mobile device, customers can simply choose to pay with the digital wallet, and all information generally required to make a purchase is communicated to the merchant or vendor.

As the number of such transactions increases, it has become difficult for consumers to review their purchases for purposes of monitoring how they are spending their money, to determine whether the money is spent within the consumer's guidelines or budget, and to keep track of receipts whether on paper or those sent electronically sent to the consumer's e-mail address(es).

There are a variety of ways in which merchants may provide assistance in the form of a receipt for a purchase. For example, when an order is placed with a merchant, especially if it is placed online, an e-mail receipt is often sent to the customer. This e-mail may include information specifying the product or products ordered, the cost, the account that the customer used to make payment, and other information concerning the order. Whether the purchase is made online, over the telephone, or in person, to receive such receipts, the customer must provide additional information (e.g., an e-mail address) during the ordering process, which only adds to the burden of placing the order. Such receipts are in a variety of formats, and do not lend themselves to accessing the data, especially for later analysis.

Typical digital wallets may display payment transaction history, but do not provide stock keeping unit (SKU) level information or visual summaries or cumulative analytics of the shopping receipts.

Credit card accounts may provide end of year statements that show expenditures in various categories. This data is for a single credit card account, and does not consolidate data for all digital payment methods. Also, such data may not be available for review at all desired times. Mint.com, and other similar online services, provide spending analysis based on the accounts (bank, credit card) that the consumer has linked to the service, but do not provide SKU level information customary in current paper or e-mail receipts. Information can be provided on merchant category level e.g., restaurants, gas stations, etc.

The TabbedOut™ mobile application displays a receipt when the tab at a restaurant or bar is closed. A receipt can be sent to the user by e-mail. It has the same limitations as other receipts noted above.

While these receipts may be helpful to a customer, there is no standard or organized way of receiving, storing, accessing, analyzing and utilizing these received receipts.

SUMMARY OF THE DISCLOSURE

There is provided a system and/or method for using a digital wallet, or an extension to a digital wallet, to receive, store, retrieve and analyze digital receipts in a single or standard format.

There is also provided such a system and/or method that have data fields associated with the digital receipt to permit the data to undergo data processing so that the data can be displayed, organized, manipulated and categorized, and various reports on expenditures can be produced.

There is further provided such a system and/or method in which digital receipts can be made available on a mobile device or online to facilitate transactions, such as customer returns.

The present disclosure has a computer readable non-transitory storage medium that stores instructions of a computer program that when executed by a computer system result in performance of steps of the method and generates a digital receipt.

BRIEF DESCRIPTION OF THE DRAWINGS

FIG. 3 is a schematic representation of one possible standard format for a digital receipt.

A component or a feature that is common to more than one figure is indicated with the same reference number in each figure.

DESCRIPTION OF THE PREFERRED EMBODIMENT

Figure 1:
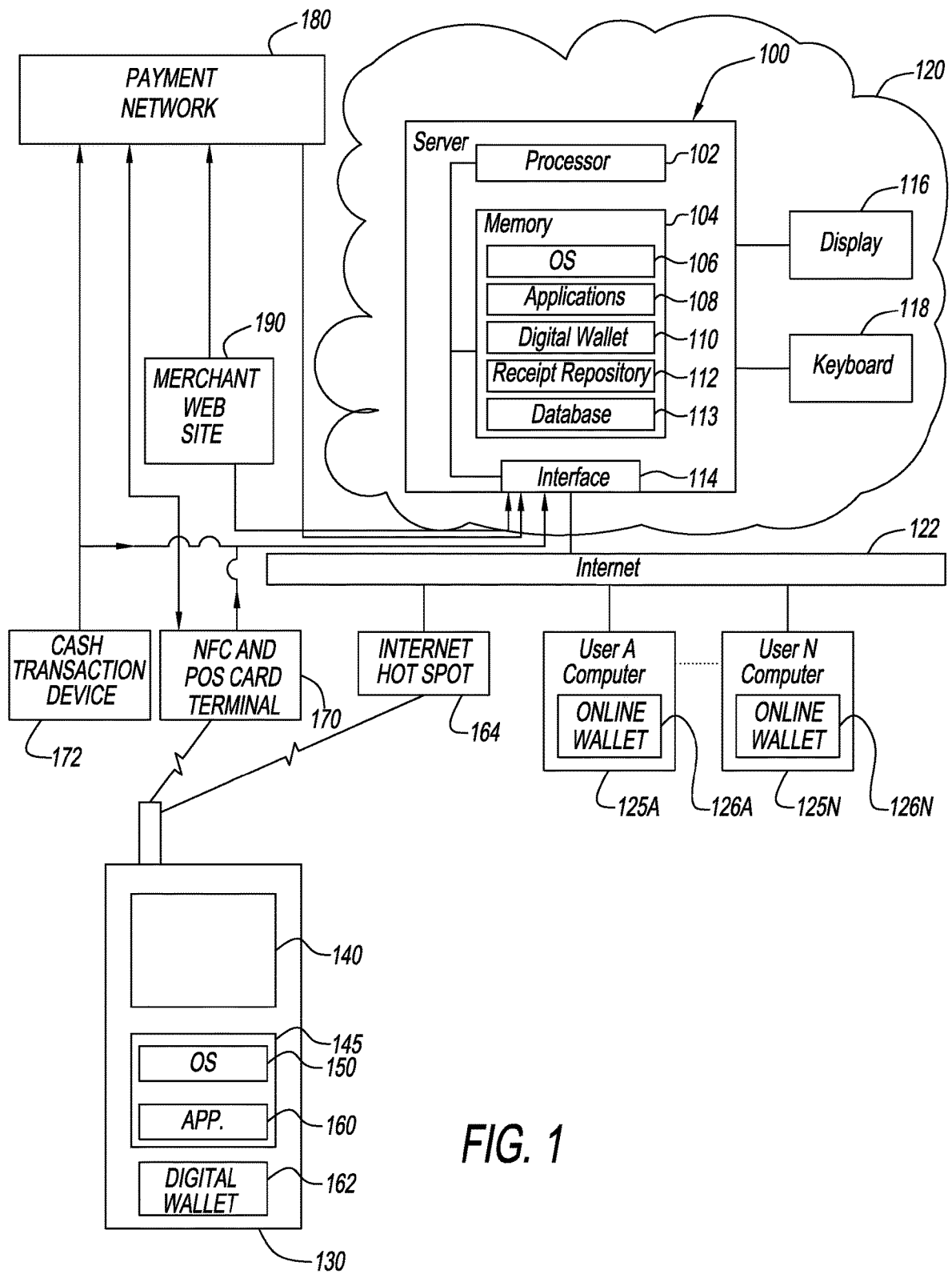
FIG. 1 is block diagram of system for implementing an exemplary embodiment of the present disclosure.

Referring to the drawings and, in particular, FIG. 1, there is shown a server generally represented by reference numeral 100. Server 100 is depicted in the cloud 120, and is configured to act as a part or as an independent extension of a digital wallet service. Server 100 is connected to the Internet 122 by an interface 114. Server 100, which can be comprised of multiple connected servers, includes a data processor 102 and a memory 104, and is connected to a display 116 and a keyboard 118 that serves as an interface for administration, maintenance and servicing of server 100. Server 100 may have a plurality of other peripheral devices customarily found in any computer, such as, for example, a CD or DVD drive (not shown), for placing programs on the server or for creating physical records of data processed by the server.

Memory 104 has a various memory portions for storing an operating system ("OS") 106 for server 100, an applications memory portion 108 for one or more application programs, and a memory portion used as a digital wallet 110.

A portion of memory 104 is configured as a digital receipt repository 112. Digital receipts are stored in a portion of memory 104 configured as a database 113.

The data stored in memory 104, and in particular the data of database 113 can be stored in any type of memory, including a hard drive, a flash memory, a CD, a RAM, or any other suitable memory, preferably with provisions for suitable backup and encryption, as well known in the art.

User computers 125A to 125N can access server 100 via a connection to the Internet 122. Computers 125A to 125N can each have an application/interface providing access to a digital online wallet 126A to 126N, respectively.

A mobile device 130 has a display 140 which may have a memory 145 for storing an operating system 150 and a series of applications or applets therein. The series of applets include an applet or application program (hereinafter an application 160) that can be, for example, a thin client or Internet Browser for use with the exemplary embodiment described herein. Application 160 and mobile device 130 access server 100 via an Internet connected wireless connection e.g., Wi-Fi hot spot 164 or by any telephone network, such as a 3G or 4G system, on which mobile device 130 communicates. Application 160 includes, or connects to, a digital wallet client 162 so that Internet purchases are quickly and easily completed. The digital wallet client 162 functionality for making purchases can reside in the Internet, as in digital wallet 110. In that case, the browser of mobile device 130 is the application that allows access to the wallet functionalities.

Purchases are made by a consumer using a computer 125A to 125N, or mobile device 130, or by swiping a payment card. Mobile device 130 communicates with a merchant's POS terminal 170 via anyone of: NFC, a quick response (QR) code, Bluetooth, and manual token code, to make a purchase. POS terminal 170 has general POS capabilities including the ability to swipe a payment card (credit, debit or prepaid). POS terminal 170 can be designed to read QR codes. POS terminal 170 is connected to a payment network 180, and to applicable payment middleware at the merchant's system, to complete the payment transaction. The user's account, whether a digital wallet, account with the merchant, loyalty program, or other source of funds includes the unique address of the user's digital receipts repository 112 in the cloud and will supply this information as part of the transaction so that a receipt may be sent to the digital receipts repository 112, which can be associated with the digital wallet 110. Digital receipts are delivered directly to the user's digital receipts repository 112 via interface 114 or via the payment network which can provide service to forward the digital receipts to users' repositories.

If a purchase is made using a cash transaction device 172, such as a conventional cash register, a paper receipt is usually generated. If a digital record is desired, the user will provide a digital wallet address to the merchant. The address of the user's digital receipts repository can, for example, be entered manually on a keyboard device or by using a loyalty card (linked to a loyalty account) or otherwise identifying the user at the POS to the merchant. The merchant delivers the digital receipt either via the payment network 180 or directly to the user's digital receipts repository 112 via the Internet 122 by using the address of the repository. Other data paths and entities for transmission of a digital receipt are available. For example, the merchant forwards the digital receipt to a corporate repository. The corporate repository then forwards the receipt to a trusted third party transmission service, which then forwards the digital receipt to the user's digital receipts repository 112. Eventually the digital receipt is accessible in digital wallet client 162 of mobile device 130 and other available interfaces for viewing and other uses. Thus, regardless of the manner in which the purchase is made, whether by a cash transaction device 172, a POS terminal 170 or with via a merchant web site 190, from an online store or site, using a payment card, a mobile digital wallet, or an online digital wallet, if the address of the digital receipt repository 112 is available, the digital receipt is submitted to the payment system.

While the digital receipt repository 112 is shown as being on server 100 in the cloud 120 and associated with a digital wallet 110, the digital receipt repository 112 can be part of an independent service, and hosted in a variety of other locations, by trusted providers including, for example, the payment network 180, a bank or another financial institution. These trusted providers can engage in research on consolidated data, while protecting the privacy of individual users.

The contents of the receipts in the digital receipt repository 112 can be filed and organized. Thus, the user can search and browse all receipts using application 160 on mobile device 130, a computer 125A to 125N, or with any other Internet connected device.

Server 100 also receives information from payment network 180. Payment network 180 can supply information, such as, which account was charged and the amount charged or other details of the purchase, which can be combined with the receipt data received from the merchant.

Online purchases can also be made by using an Internet connected device, such as one of computers 125A to 125N or mobile device, connected to a merchant web site 190. Merchant web site 190 is connected to payment network 180, and purchases can be processed using a digital wallet. The digital receipt content is delivered to the user's digital receipts repository 112 as described above.

Figure 2A:
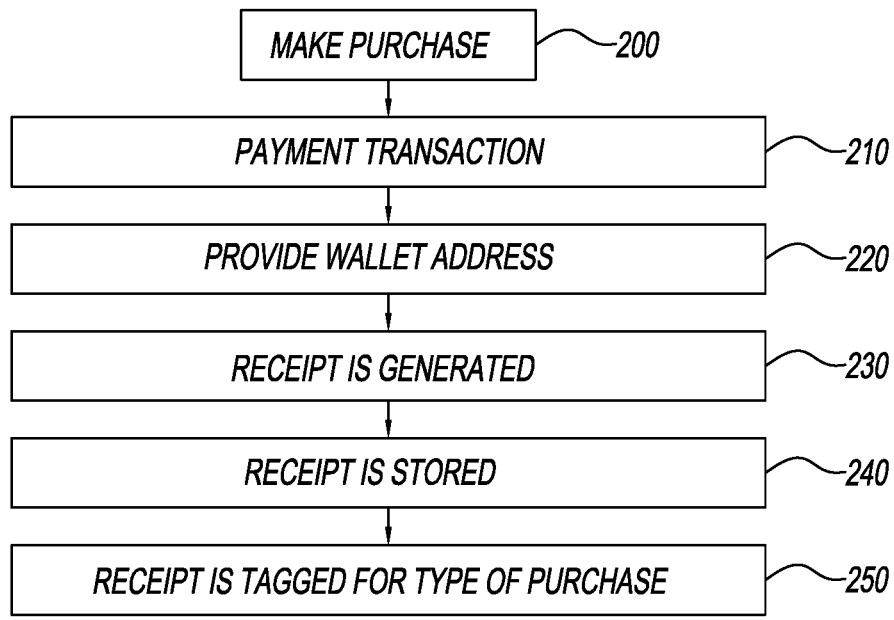
FIG. 2A is a flow chart representing the manner in which the system of FIG. 1 operates.

Referring to FIG. 2A, the user, at 200, uses one of the computers 125A to 125N (or mobile device 130) to make a purchase online or at a POS. In particular, a digital wallet 160 capable application is used to facilitate the purchase via mobile device 130, or one of online digital wallets 126A to 126N is used to facilitate purchases with one of computers 125A to 125N, respectively. User's digital wallet and payment information includes the address or location of the payer's digital receipts repository 112 where the digital receipt will be sent. This address or location may be expressed as a unique URL. The payer's digital receipts repository location/ID may also reside at the merchant's customer records (such as loyalty program or customer database) and may be found there in addition to or in place of the payment method. The customer should have the option to opt in or out of using the merchant provided facility.

A payment is made at 210, which can be a conventional payment transaction, in which payment information (or a payment token) is communicated to the merchant. When using a cloud based digital wallet 110, the apparatus or device used is essentially just an access device for making the payment. Payment information is generally communicated as is customary for electronic payments. The method to receive digital receipts relies on all current and regular methods for secure payments. An additional element is the communication of the user's digital receipt repository address/identifier (e.g., a URL) where the digital receipt is sent when the payment is made.

Referring again to FIG. 2A, at 220, if required, the customer provides the address of the digital receipt repository 112. At 230, the digital receipt is generated using information from the merchant, and can obtain additional sources of information from, for example, the account or the digital wallet. The appropriate user account is accessed and is debited in the amount required for the purchase. The digital wallet functionality may have access and be linked to more than one of the user's accounts, such as, for example, different credit card accounts, so that the user can decide which account to use for a particular purchase. At 240, the digital receipt is stored in the digital receipt repository 112. At 250, the receipt may be tagged by the user, as described below.

While not included in the digital receipt repository function, a user's bank will confirm the amount that has been charged due to the transaction. The appropriate standard fields of the digital receipt, discussed below with respect to FIG. 3, are populated with the received information. The user's electronic payment details include the address of the user's unique digital receipts repository address (URL) in a dedicated payment data field. The payment network may also send receipt content that is merged with the merchant's content or can be used, for example, if the merchant does not provide digitally compatible receipt data or the payment network 180 may provide a routing service.

It is advantageous for the user of the digital receipts service and digital wallet client 162 on online digital wallet 126A to 126N to have the opportunity to tag and annotate 250 the digital receipt in some way both automatically and manually. While a merchant code may provide adequate information, there are situations in which a user desires to tag items in different types of categories, such as, for example, business expenses or personal expenses, or make other annotations. Also, for example, the user could set up an alert to display when the warranty included in the purchase is expiring.

A stored digital receipt will always be available to the user to recall from cloud 120, or wherever the digital receipt repository is located. Thus, paper receipts are not required. The receipt stored on, for example, server 100 in cloud 120 has the advantages of never being lost, and always available for subsequent analysis. Thus, the receipt can be used to return goods to receive a refund, or to receive a refund for a portion of services not yet performed.

Figure 2B:
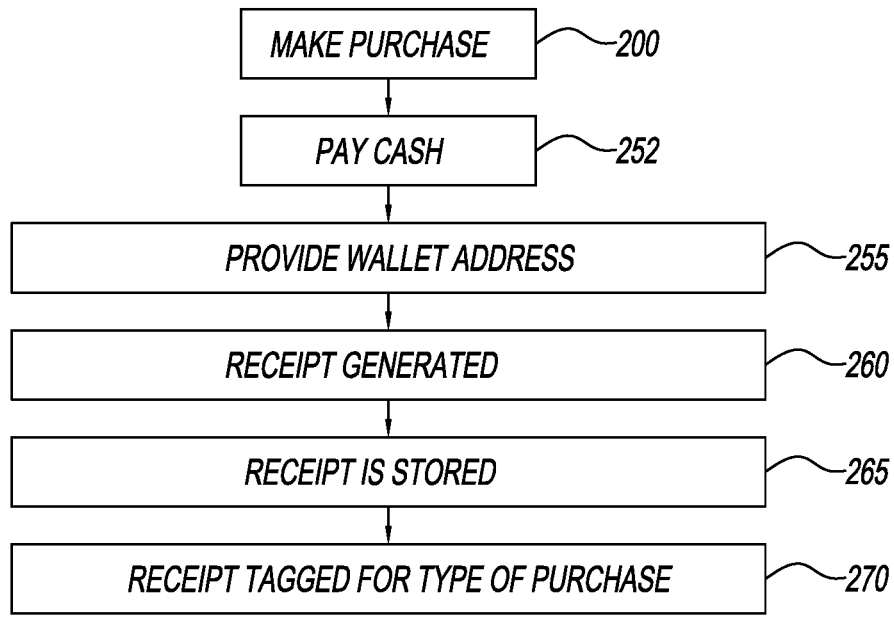
FIG. 2B is a flow chart representing the manner in which the system of FIG. 1 operates when payment is made with cash.

Referring to FIG. 2B, at 200, the user may make a purchase, and at 250, may elect to pay cash. At 255, the user is asked to provide an address to which a digital receipt may be electronically transmitted. At 260, a digital receipt is generated analogous to 230 of FIG. 2A. A conventional hard copy receipt can also be provided. At 265, the receipt is transmitted to the digital receipts repository 112 and/or payment network to be forwarded to the server 100 where it is stored. At 270, the receipt is tagged as described above.

Referring again to FIG. 1, the data representative of the digital receipt is stored in database portion 113 of memory 104 in a series of fields. Preferably, the data is stored in a standard, text searchable format, which is actionable. Actionable as used herein means that the data can be retrieved, read or manipulated so that the data can be used, compiled or analyzed in any manner required, and if desired, can be displayed in any format as text, a graph, animation, report or in any other user perceivable format. Further, memory 104 may have an underlying database program that allows a user to, for example, search for a particular entry or classify receipts or arrange or group receipts, and thus various reports can be generated. Database AP Is may be available to provide easy access to programs to utilize receipt data in various applications or thin clients.

As shown in FIG. 3, a first series of fields identify the business with which a user has conducted a payment transaction. These fields preferably include the business name 300, business address 302, business telephone number 304, business fax number 306, business e-mail address 308, and the business or merchant category code (also known as card acceptor business code when credit card accounts are used) 310 that is an indication of the type of business in which the merchant is involved. Such merchant information can indicate, for example, that the merchant is an automobile servicing business or gas station. Other possible fields include receipt/transaction number/ID and merchant's internal code(s).

Field 312 contains information on the manner or how the purchase was made. Field 312 may also indicate that a digital wallet has been used. Acceptable values for field 312 can be represented by a predefined code, for example, 1=online, 2=POS, 3=digital wallet, 4=payment card, 5=NFC, 6=cash. Multiple values can be accepted. New methods must be registered as predefined codes. Data in this field can be representative of a telephone purchase, where the merchant manually entered payment information into POS terminal 170 of FIG. 1, without a credit being at the merchant location. For example, the user can provide the repository location as a URL (or respective tiny URL) over the phone to be linked to the telephone purchase, or data could be sent as an e-mail attachment to a customer's wallet account, which would extract the data automatically to the receipt repository. The user could also key in or scan/tab/enter a token identifier at the POS to the repository address when making a purchase using cash. The user's loyalty card or customer account at the merchant could include the link to the user's digital receipt repository, in some cases associated with the user's digital wallet, where digital receipts can be sent so that when the loyalty card is scanned, the repository address becomes known.

The next series of fields in FIG. 3 contain customer information. These fields are customer name 320, customer address 322, customer telephone number 324, customer fax number 326, and customer e-mail address 328. The customer's payment account number used to fund the transaction is stored in field 330, and the currency type used (United States dollars, Japanese yen, etc.) is stored in field 332. The customer payment account in field 330 can be stored so that only the last four digits are displayed by default or printed if a hard copy of the digital receipt must be produced. Alternatively, only the last four digits need be stored or revealed. While the full customer payment account number is required to issue a refund, this information will generally be available at the merchant and additionally also when: (a) the customer is present to return goods and the mobile device 130 or credit card used to conduct the original transaction is also present, or (b) if the customer is online and uses the same computer used to make the original purchase. The digital receipt including the payment information can also be provided from the receipts repository, as needed. Other possible fields include but are not limited to: customer's loyalty card number, customer ID, customer account number at the merchant, billing and delivery addresses, registration link, link to warranty, advertisement, coupons, post to social media, and e-mail to a friend. Since the digital receipt is not limited by space or content format, the merchant could also collaborate with other merchants with complementary services and, for example, sell personalized advertising space (as an example, someone shopping at Bloomingdales could be a target market for Whole Foods). Receipt also can easily incorporate logos as active links; for example, if payment was made by using a MasterCard™ payment card the MasterCard logo can appear as the identification for the payment method.

An expandable field 340 in FIG. 3 relates to the item or items that have been purchased during the transaction. Expandable field 340 includes for the first item purchased, subfields for a brief description of the goods/services 342A and a secondary free description field, for example, including weight, price and color of the item purchased, the SKU number 342B, and the price 342C and applicable taxes. SKU data may also include an image of the purchased item. For the second item purchased, the fields are a brief description of the goods/services and a secondary free description field 344A, the SKU number 344B, and the price 344C. For the third item purchased, the subfields are again a brief description of the goods/services and a secondary free description field 346A, the SKU number 346B, and the price 346C. Such expansion of expandable field 340 is repeated for each item purchased.

The time and date of the transaction or purchase are stored in fields 348A and 348B, respectively, as separate fields are needed for date and time. Fields should be structured so that various global date and time formats can be supported (for example dd/mm/yyyy and mm/dd/yyyy). In general, for analytics purposes, each field in the receipt must contain a single data point to follow known best practices for applicable database architecture. However, as noted above multiple values are acceptable in certain cases. For localization and internationalization purposes, the receipt format should have a field that indicates locale, which is linked to local formats.

Data representing the sum of the prices 342C, 344C, 346C etc. is stored in field 350. Data representing any taxes on the total price is stored in fields 352A, 352B, 352C and 352D. For example, these fields 352A, 352B, 352C and 352D may be assigned to a VAT tax, a local sales tax, or a special tax on the specific goods or services. Multiple discounts may be applied, whether provided as promotions by the merchant, or made available on the basis of coupon codes, or of any other discount type. Discount data is stored in fields 354A, 354B, 354C and 354D. Data representing the total paid is stored in field 356.

Additional fields 358A, 358B, 358C and 358D are used to store user designated tags, as mentioned above with respect to 260 of FIG. 2. A series of predefined, or user defined, indicators may be established to assist the user in classifying and categorizing the various purchases automatically and manually. The user interface presents tags in clear human readable text/icon format. Examples are food, clothes, travel, entertainment, medical and shelter related expenses. The merchant category code can also be stored in a subfield. If no code is entered, the merchant category code alone may be used as a default to classify the purchase or purchases. Empty fields are accepted. Additional fields may be defined by merchants and can be displayed by the digital receipt system (for example product image, merchant website, Facebook® link, survey link). Additional fields can also be added to the standard to cover various types of receipts and to ensure rich analytics of the user's cumulative receipts data. Fields of undefined type may be supported.

Various APIs can be used to analyze the data of the digital receipts stored in the digital receipts repository on server 100. Analysis parsed by SKU number, or by groups of SKU numbers, is particularly useful for detailed analysis of spending trends, which can be for a selected year or for all years from the time that data from digital receipts was first stored. As is well known in user interface design, the most recently viewed analytics could be maintained in the device or application accessing the analytics, e.g. a mobile device, so that on returning to the data display, the content from previous session is displayed by default.

Figure 4B:
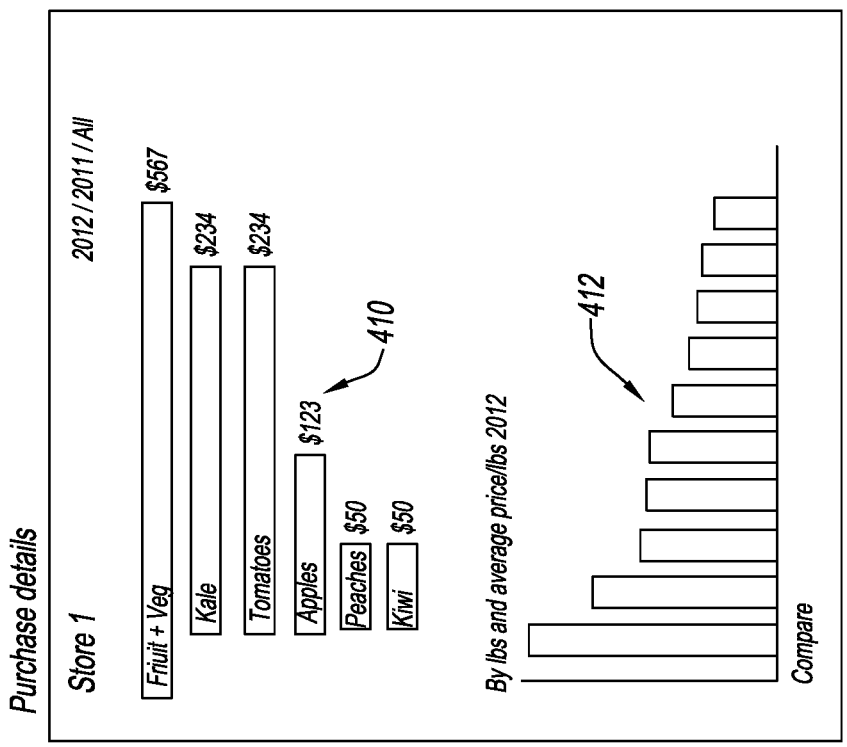
FIGS. 4A, 4B, 4C, 4D and 4E illustrate examples of possible displays generated by various analytical tools to provide analysis of spending.
Figure 4A:
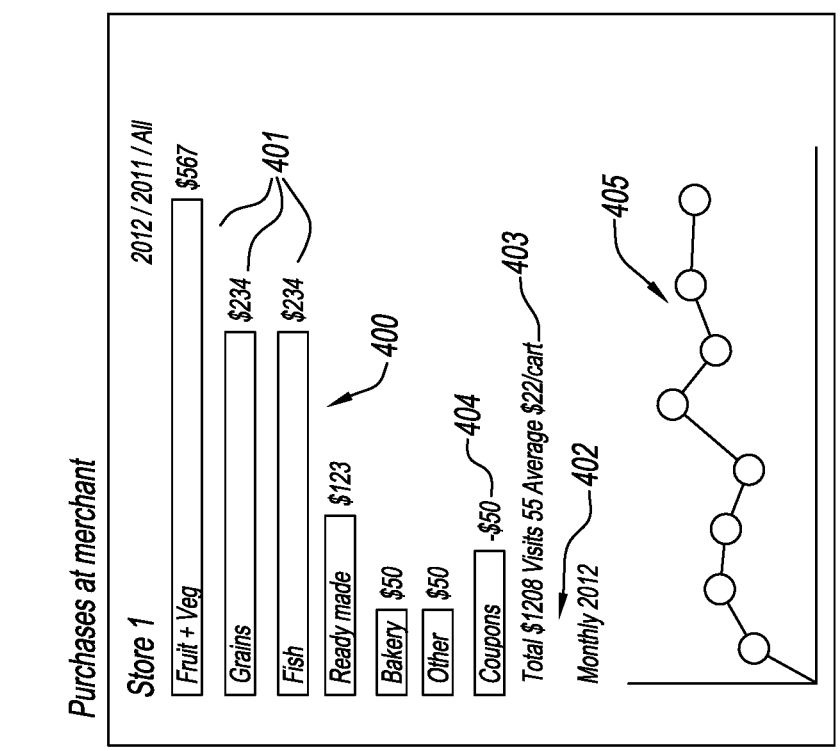

FIG. 4A is a display of expenditures for various food types 400, including for one year the total spent for each type 401, the total for all types 402, the monthly average 403, and the total discount due to the use of coupons 404. A graph 405 of monthly expenditures is provided.

FIG. 4B is a display of the expenditures of FIG. 4A for fruits and vegetables of various kinds 410. A bar graph 412 of monthly total pounds and price per pound is provided.

Figure 4D:
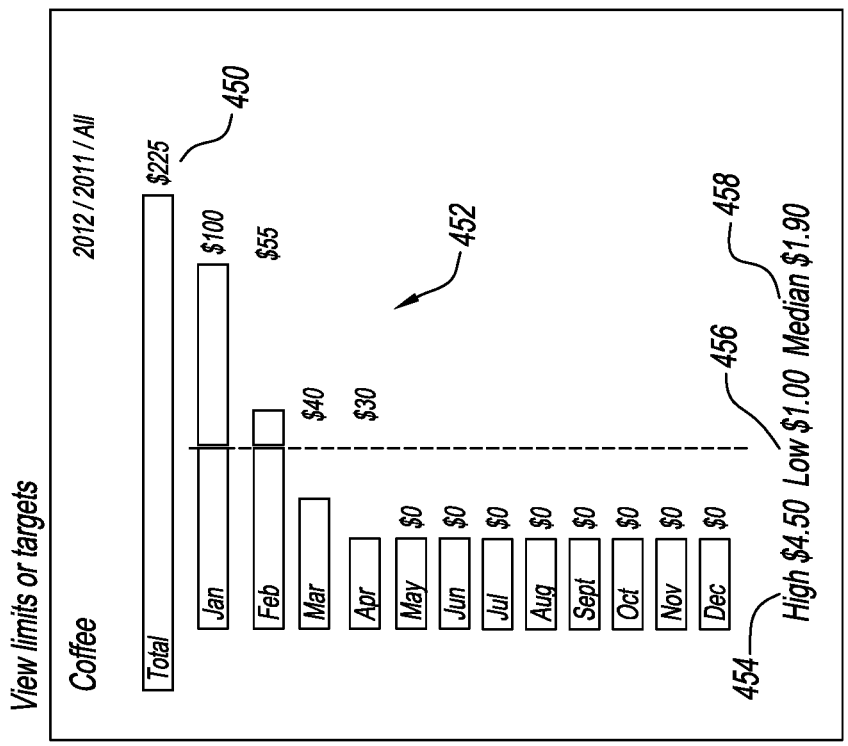
Figure 4C:
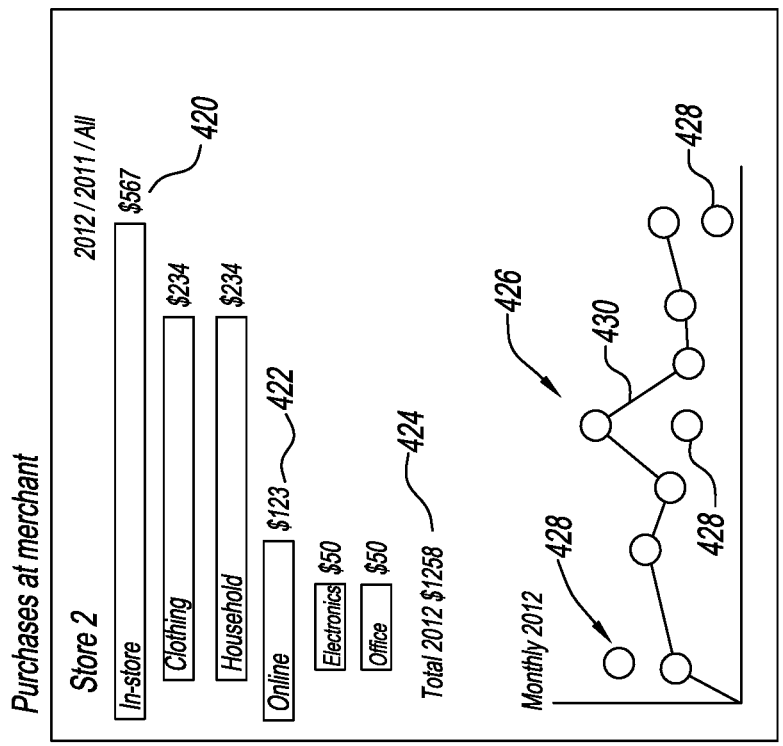

FIG. 4C is a display of purchases at a particular store. Total in-store 420 and online 422 expenditures for particular categories are provided, as is the total expenditure 424 for the year. A graph 426 by month for all expenditures is also provided, including online 428 and in-store 430 expenditures.

FIG. 4D is display of monthly expenditures for a particular product; in this case coffee. The total 450, monthly 452, highest 454, lowest 456 and median 458 expenditures are displayed.

Figure 4E:
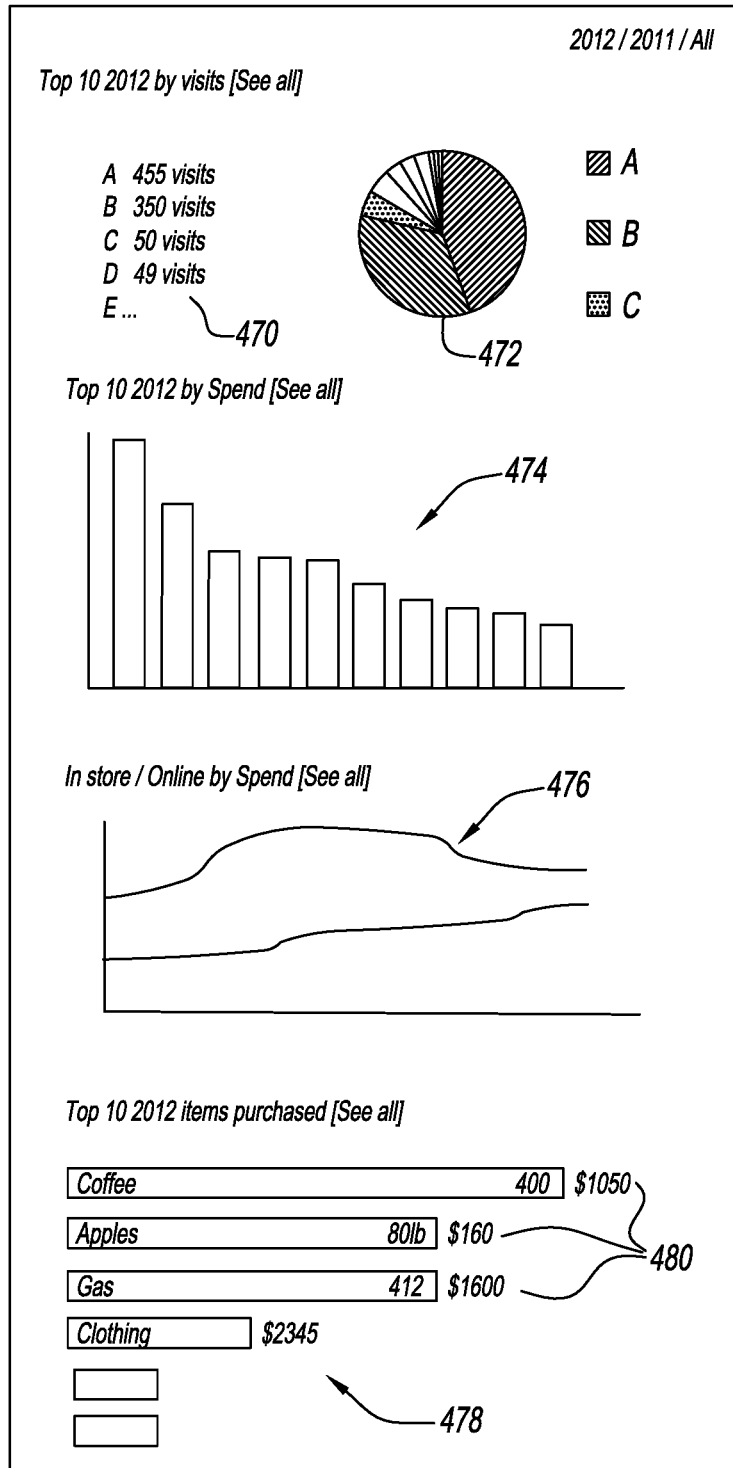

FIG. 4E is an example of possible year summaries showing locations most often visited for shopping, with the top ten locations illustrated in a list 470 and a pie chart 472. A bar graph 474 of the amount spent at each location is shown. A graph 476 of in-store and online spending for all locations, as a function of time, is displayed. The top ten categories or items purchased 478 are displayed, as well as the total amount spent for each 480.

There are numerous advantages offered by the disclosed exemplary embodiment. When using a digital payment, the customer always receives a digital (electronic) receipt when a purchase is made, either online or at a POS. Furthermore, the method can be extended to cash purchases as well. The receipt is in a standard format. Any account used to make purchases can link the purchases to the user's digital receipts repository service in the cloud. The receipts are stored in the cloud, where the receipts are always available for retrieval and for other uses. The user has access to all receipts, including SKU level data, from the user's mobile and online devices, and can utilize various types of analytics to review personal purchasing data for purchasing history, trends, categories, favorite products or types of products and stores. This feature thus provides insights into personal spending and purchasing behavior. The data can be used to analyze spending, taxes paid, or any other variable on a daily, weekly, monthly, or yearly basis. The data can be exported to a spread sheet program to facilitate inspection and analysis of the data. Analytical tools can be provided for use on a mobile device or on any online device to make such analysis easy and desirable to use. Thus, the user will be more likely to use a digital wallet and, in particular, a digital wallet that supports such receipts repository and analytical tools. The data can be made available for view by the user in the form of, for example, list, pie chart, bar graph, animation or any convenient format. Data displayed can include, for example, the top ten most frequently purchased items, total spending as a function of time at various merchants, spending on different product categories or actual products (e.g. Latte YoY), and the high, low and median price paid for a particular product. The latter may assist the user in finding, for example, the lowest price previously paid for a commodity, and the location where that price was paid. This is particularly useful for searching for the lowest price gasoline station or groceries, for example. The digital receipts repository system may also combine data from other sources to provide richer experience, including product images, product details, links to merchant's customer service, merchant's location, offers and coupons. The user can click to see merchant details, a map, and more.

Database queries are made using SQL or similar, known database management (DBM) tools and processes. Predefined APIs access and "mash up" or combine receipt data for processing, and can be used directly from user friendly commands or search options in the user interface (application, thin client, browser view). For example, from a search view, the user could select the year 2012 and the category gasoline, and see a timeline of purchases, amounts and prices, total and averages, and frequent locations. Data can be tied to personal financial software to allow for budgeting, keeping track of expenses, and possibly for tax preparation purposes.

By using the system and method described herein, shopping can become a truly paperless endeavor. A receipt is always available. The receipt cannot be stolen or misplaced. Receipts are securely stored with appropriate user access restrictions, e.g. user name and password, required to access data. User's purchases are linked to the digital receipts repository account where receipts are sent and stored. The user may analyze the personal data, using the appropriate analytical tools, either separately or together, as and when the user desires. The method also includes an option for the merchant to define the order in which the fields in their receipts are displayed, if different from a default order. The user may choose to view receipts in a default field order. The method can be made available at all points of sale or points of interaction. The user can opt to have all receipts stored in a digital receipts repository in the cloud. If desired by the user, a digital receipt may also be exported from the repository e.g. sent to a specified e-mail account.

The merchant or vendor of products also enjoys several advantages. The data sent to digital receipts repository can be stored and monitored so that the merchants and, for example, an independent third party, can analyze the data in ways of interest to the merchant. Purchasing trends and other valuable business information may be extracted from the data. This extracted data assists the merchant to better serve its customers and enhance profitability. Merchants can "go green" by reducing paper usage. This attracts customers who prefer a paperless option. Merchants can add to the digital receipts various communications including, but not limited to images, product offers, digital coupons and links. Space on digital receipts can be sold or rented to affiliated merchants or those offering complimentary goods or services. This allows merchants to connect with customers directly via their mobile and connected devices and personalize their communication with the individual customers.

Payment card issuers, acquirers and payment system operators also benefit from the use of credit cards or other digital payment methods, such as electronic wallets. Rich digital payment data and receipts are handled in the payment network, to facilitate providing analytics services to merchants. The system and method described herein is useable to provide a digital wallet with fully digital receipts.

Various approaches, technologies and pathways can be used to access server 100. In general, the Internet is used. Access may be granted to a home or a business computer including a desk top, lap top, or notebook computer; a personal digital assistant; or any other Internet connected device, such as a tablet (for example, a device such as an iPad®) and mobile device (e.g. a smartphone). Server 100 management can be done through a private access channel such as intranet or virtual private network (VPN) for greater security.

It will be understood that the present disclosure may be embodied in a computer readable non-transitory storage medium. The medium stores instructions of a computer program that when executed by a computer system results in performance of steps of the method described herein. Such storage media may include any of those mentioned in the description above.

The terms "comprises" or "comprising" are to be interpreted as specifying the presence of the stated features, integers, steps or components, but not precluding the presence of one or more other features, integers, steps or components or groups thereof.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A method for generating and storing a digital receipt for purchases made using a digital wallet, the method performed by a processor executing instructions, the method comprising:
    initiating a purchase transaction at a point of sale (POS) terminal of a merchant between the merchant and a customer with a user device that has a digital wallet application program;
    receiving, by the POS from the user device, in a communication between the user device and the POS terminal, payment information from the digital wallet to complete the purchase transaction and a unique address of a digital receipt repository for the digital wallet in the form of an internet uniform resource locator (URL), wherein the user device and POS terminal comprise circuitry to effect the communication by at least one method selected from the group consisting of: near field communication (NFC), a communicated quick response (QR) code, and Bluetooth communication;
    in response to completing the purchase transaction, generating the digital receipt for the purchase transaction by the POS device, the data of the digital receipt being stored in a plurality of data fields as actionable, text searchable data;
    transmitting the digital receipt directly from the POS terminal to the URL of the digital receipt repository using the URL; and
    granting the customer access via the digital wallet application program to the digital receipt via the URL.

2. The method of claim 1, wherein the POS terminal is in communication with a payment network.

3. The method of claim 1, wherein the transmitting of the digital receipt is direct to the URL.

4. The method of claim 1,
    wherein the POS terminal is in communication with a payment network, and
    wherein the transmitting of the digital receipt is from the POS terminal to the payment network and then to the URL.

5. The method of claim 1, further comprising:
    organizing the content of the receipt for searching and displaying on the user device.

6. The method of claim 1, further comprising:
    sending a copy of the digital receipt from the digital wallet to a specified e-mail address.

7. The method of claim 1, further comprising:
    sending a copy of the digital receipt from the POS terminal to a specified e-mail address.

8. The method of claim 1, further comprising:
adding a digital coupon to the digital receipt by the merchant.

9. The method of claim 1,
wherein the digital receipt is a plurality of digital receipts and the receipts are for a single credit card.

10. The method of claim 9, further comprising:
analyzing the digital receipts;
generating a report of spending and taxes paid, on a daily, weekly, monthly, and yearly basis based on the analysis; and
displaying the report on the user device.

11. The method of claim 1, further comprising:
storing warranty information for the purchase transaction with the digital receipt; and
displaying an alert on the user device when the warranty for the purchase transaction is about to expire.

12. The method of claim 1, wherein the digital receipt has data fields that are in a text searchable format.

13. The method of claim 12, further comprising:
processing data in the data fields so that the data can be displayed, organized, manipulated, and categorized.

14. The method of claim 12, further comprising:
generating an analytic using information from the data fields, wherein the analytic is at least one analytic selected from the group consisting of: a graph, pie chart, a list of top ten categories, and an animation; and
displaying the analytic on the user device.

15. The method of claim 12, further comprising:
annotating the digital receipt with a searchable tag.

* * * * *